(12) United States Patent
Thomas et al.

(10) Patent No.: US 8,335,935 B2
(45) Date of Patent: Dec. 18, 2012

(54) POWER MANAGEMENT BASED ON AUTOMATIC WORKLOAD DETECTION

(75) Inventors: Sujith Thomas, Bangalore (IN); Ananth R. Krishna, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 374 days.

(21) Appl. No.: 12/748,974

(22) Filed: Mar. 29, 2010

(65) Prior Publication Data
US 2011/0239020 A1 Sep. 29, 2011

(51) Int. Cl.
G06F 1/00 (2006.01)
G06F 1/26 (2006.01)
G06F 1/32 (2006.01)

(52) U.S. Cl. ......... 713/300; 713/320; 713/322; 713/324
(58) Field of Classification Search .................. 713/300, 713/320, 322, 324
See application file for complete search history.

(56) References Cited

U.S. PATENT DOCUMENTS

| | | | | |
|---|---|---|---|---|
| 6,298,448 B1* | 10/2001 | Shaffer et al. | ................. | 713/322 |
| 6,367,022 B1* | 4/2002 | Gillespie et al. | ............. | 713/300 |
| 6,460,143 B1* | 10/2002 | Howard et al. | ............... | 713/323 |
| 2003/0115495 A1* | 6/2003 | Rawson, III | .................. | 713/324 |
| 2005/0144486 A1* | 6/2005 | Komarla et al. | ............. | 713/300 |
| 2009/0249094 A1* | 10/2009 | Marshall et al. | .............. | 713/320 |
| 2011/0307891 A1* | 12/2011 | Orr et al. | ........................ | 718/100 |

FOREIGN PATENT DOCUMENTS

| JP | 04-184627 | 7/1992 |
| JP | 2002-264057 | 9/2002 |
| JP | 2005-312011 | 11/2005 |

OTHER PUBLICATIONS

Japanese Office Action dated Aug. 14, 2012 with translation.

* cited by examiner

*Primary Examiner* — Mark Connolly
(74) *Attorney, Agent, or Firm* — KED & Associates LLP

(57) ABSTRACT

An electronic device includes a kernel, a power manager to control power to a hardware component, and a neural network to monitor the kernel to recognize performance of a function of the electronic device. The neural network sends a signal to the power manager to reduce or turn off power to the hardware component based on information generated during monitoring of the kernel. The information may provide an indication of hit symbols for hardware components which are to be powered and/or hardware components which do not require power based on one or more operations performed by the kernel.

22 Claims, 9 Drawing Sheets

Multiperceptron Network

Graphs of Output for XOR Network

POWER MANAGEMENT BASED ON AUTOMATIC WORKLOAD DETECTION

FIELD

One or more embodiments described herein relate to power management.

BACKGROUND

Power management continues to be a goal of electronic system designers. One approach involves using a central processing unit (CPU) to turn off system components that are not being used. However, using the CPU for this purpose is not optimal because of the large amount of power that it consumes.

DETAILED DESCRIPTION

In accordance with one or more embodiments of the present invention, power management is performed without using the main processor of an electronic device and/or during a time when the main processor is in an idle state. The electronic device may be any one of a number of battery-powered devices such as but not limited to a mobile phone, personal digital assistant, media player, or laptop or notebook computer. Alternatively, the electronic device may be an AC-powered device that is usually used at a fixed location such as a desktop computer, television, DVD or other type of media player, surround-sound or other media receiver just to name a few.

Figure 1:
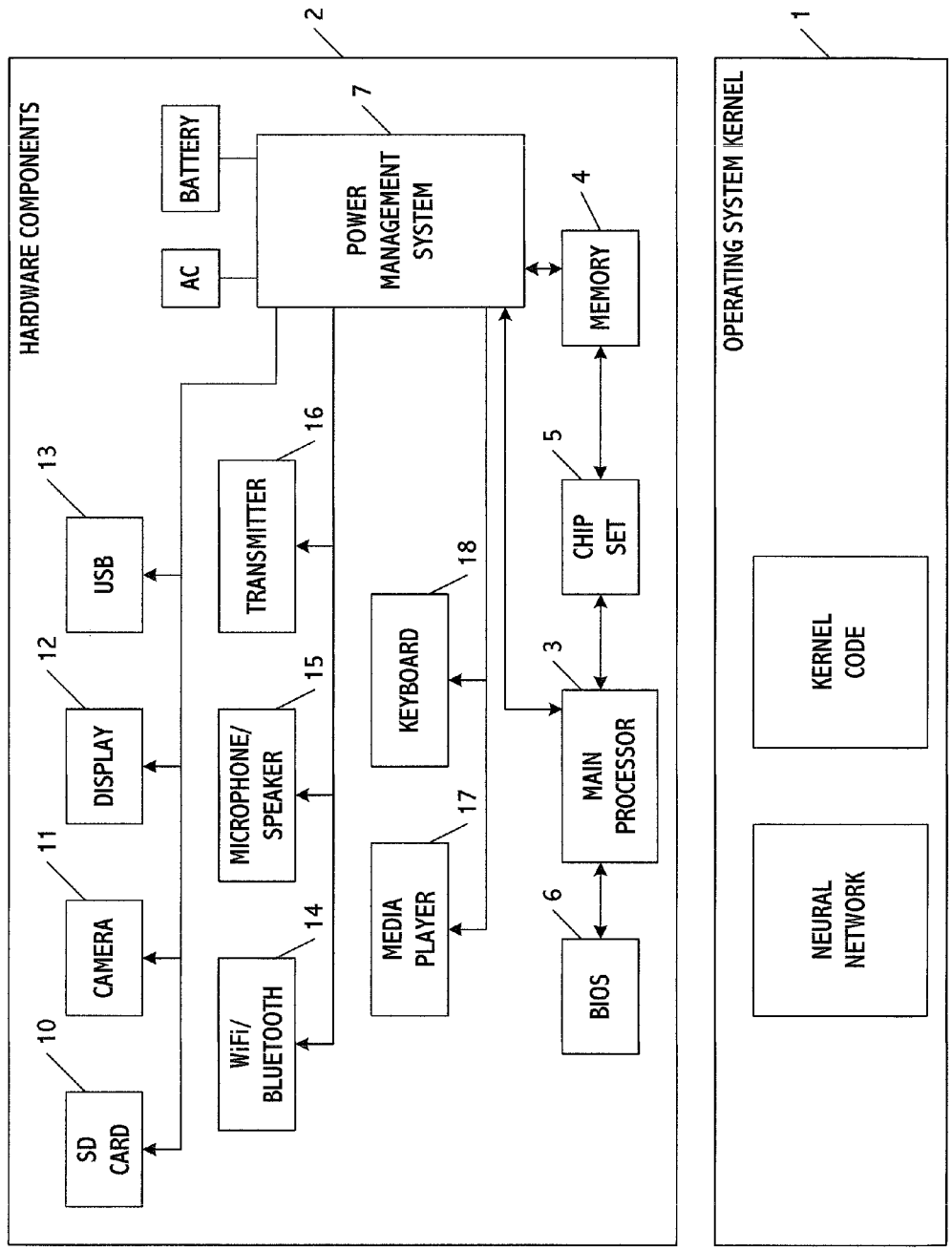
FIG. 1 is a diagram showing one embodiment of a system for managing power of an electronic device.

FIG. 1 shows an example of the internal architecture of an electronic device subject to power management. This architecture includes an operating system Kernel 1 which executes instructions (code) for controlling core and sub-system hardware components 2.

More specifically, the Kernel is a program that serves as the central core of the operating system and is booted when the device powered on. The Kernel controls the hardware components, sometimes directly without use of the main processor. The Kernel itself does not interact directly with the user, but rather interacts with the shell and other programs, as well as with the hardware components including the main processor (e.g., central processing unit), memory, drivers, etc.

For example, the Kernel may control basic services for various parts of the operating system including memory management, process management, file management and I/O (input/output) management (i.e., accessing the peripheral devices). These services are requested by other parts of the operating system or by application programs through a specified set of program interfaces referred to as system calls.

Because of its critical nature, the Kernel code 22 is usually loaded into a protected area of a memory which prevents it from being overwritten by other, less frequently used parts of the operating system or by application programs. The Kernel performs tasks such as executing processes and handling interrupts in a kernel space, as opposed to user-controlled processes or the running of application programs which are performed in a user space. This separation is made in order to prevent user data and kernel data from interfering with each other and thereby diminishing performance or causing the system to become unstable (and possibly crashing).

The structure and code of the Kernel may vary according to the operating system and/or the electronic device into which it is implemented. By way of example, the Kernel may include a scheduler, supervisor, interrupt handler, and memory manager. The scheduler may determine how various processes share the Kernel's processing time, including in what order. The supervisor may control use of the main processor to each process when it is scheduled The interrupt handler may handle requests from various hardware sub-systems which compete for the Kernel's services. And, the memory manager may allocate address space in memory for various uses.

In accordance with one embodiment, the Kernel may be the Linux Kernel. However, any other Kernel may be used in accordance with the embodiments described herein, including but not limited to a Windows-type Kernel or the Unix-based Kernel.

The core components which are subject to Kernel control may include a main processor 3, memory 4, chipset 5, basic input/output system (BIOS) 6 and power management system 7, the latter of which may be coupled to a battery 8 and AC power circuit 9. The sub-systems may include, for example, a secure digital (SD) memory card 10, a camera 11, a display 12, universal serial bus (USB) circuit 13, Wi-Fi and/or Bluetooth circuits 14, microphone and speaker circuits 15, transmitter 16, media player 17, and keyboard 18. Of course, a different arrangement or combination of sub-system components may be included depending, for example, on the type of electronic device.

Preliminary Operations

Figure 2:
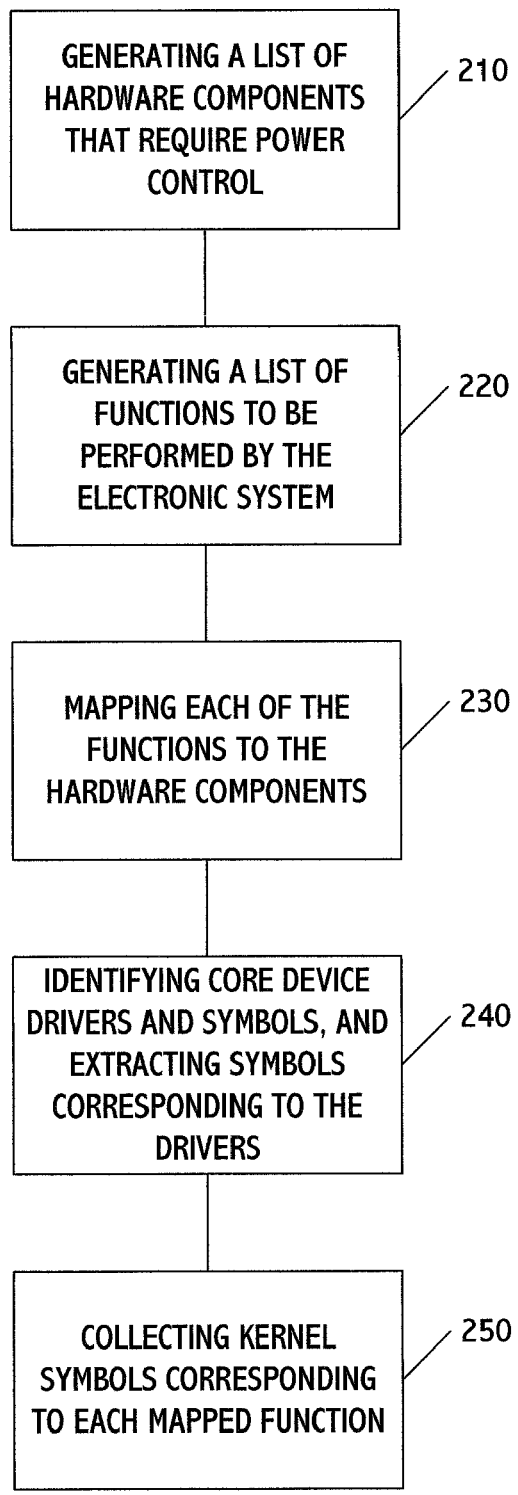
FIG. 2 is a diagram showing preliminary operations performed for one embodiment of a method for managing power of an electronic device.

FIG. 2 shows preliminary operations that may be performed in one embodiment of a power management method which, for example, may be implemented in the electronic device shown in FIG. 1. For illustrative purposes, the electronic device is assumed to be battery-powered device such as a mobile phone.

A first operation of the method includes generating a list of hardware components which require power control. (Block 210). These devices may be referred to as power islands in some mobile platforms. The hardware components may include any arrangement of core and/or sub-system components including but not limited to the ones previously discussed.

A second operation includes generating a list of functions that may be performed in or by the electronic device. (Block 220). These functions (which, for example, may be referred to as "use cases") may be based on the types of hardware subsystem components in the electronic device.

A third operation includes mapping each of the functions to the hardware components. (Block 230). For example, if the electronic device is a mobile phone having a media player, the audio playback function of the phone may be mapped to the audio hardware (e.g., speakers) and SD input/output (SDIO) circuits of the phone. A sample list of functions that may be generated in the case where the device is a mobile phone is provided in Table 1 below.

TABLE 1

| Function (Use Case) | Audio | SDIO | WiFi | Gfx |
| --- | --- | --- | --- | --- |
| Audio Playback from SD Card | 1 | 1 | 0 | 0 |
| Video Streaming over Internet | 1 | 0 | 1 | 1 |
| Display Photo from SD Card | 0 | 1 | 0 | 1 |
| Video Playback from SD Card | 1 | 1 | 0 | 1 |

In Table 1, the symbol Gfx refers to a hardware sub-system used to generate visual graphics on a display. Also, the symbol "1" indicates that the hardware sub-system is required to be used to perform a corresponding one of the functions and the symbol "0" indicates that the corresponding hardware sub-system is not required to be used for that function.

A fourth operation includes identifying core device drivers of the electronic device and then extracting symbols which correspond to those drivers. (Block 240). Any one of a number of software tools may be used to perform this operation. For example, for a Linux Kernel, the device drivers and symbols may be identified and extracted using an "objdump" command, i.e., a program or program instruction used to read information from and display information about object files. In other embodiments, a different tool or utility may be used.

A fifth operation includes collecting Kernel symbols that correspond to ("hit" for) each mapped function generated in the third operation. (Block 250).

All of the information in the aforementioned operations may be stored in an internal memory of the electronic device for use by the Kernel in managing power. Moreover, this information may be used as a basis for performing power management without involving the main processor (e.g., CPU) of the system, which is one of the hardware components that consumes the most power. Also, because use of the main processor is not required, power can be managed, for example, when the main processor is in idle or standby mode, as well as at other times such as when the main processor is actively used to process calls or to perform functions unrelated to a certain sub-system operation. In this latter cause, the workload of the main processor is not increased by the power management operations.

Once all of the information derived from the foregoing operations has been obtained and stored, the power management phase of the present method may be performed on a function-by-function basis. That is, for each mapped function, a list of hardware sub-systems which are not used may be determined. For example, in Table 1, the audio playback function from the SD card does not involve the WiFi and graphics (Gfx) hardware sub-systems. And, the photo display from SD card function does not involve the WiFi and audio hardware sub-systems. Thus, when each function is performed, one or more power management operations may be executed to reduce or shut off power to unused sub-systems, all without involving the main processor.

In accordance with one embodiment, power management operations are performed based on operation of the Kernel and, more specifically, based on instructions (code) which the Kernel executes in order to perform functions in the electronic device. This may be accomplished by controlling power management system 7 as shown in FIG. 1 to manage (e.g., reduce or shut off) power to the unused hardware subsystems, thereby bypassing the main processor. Because the main processor is not being used, substantial power savings may be realized.

Power Management

Figure 3:
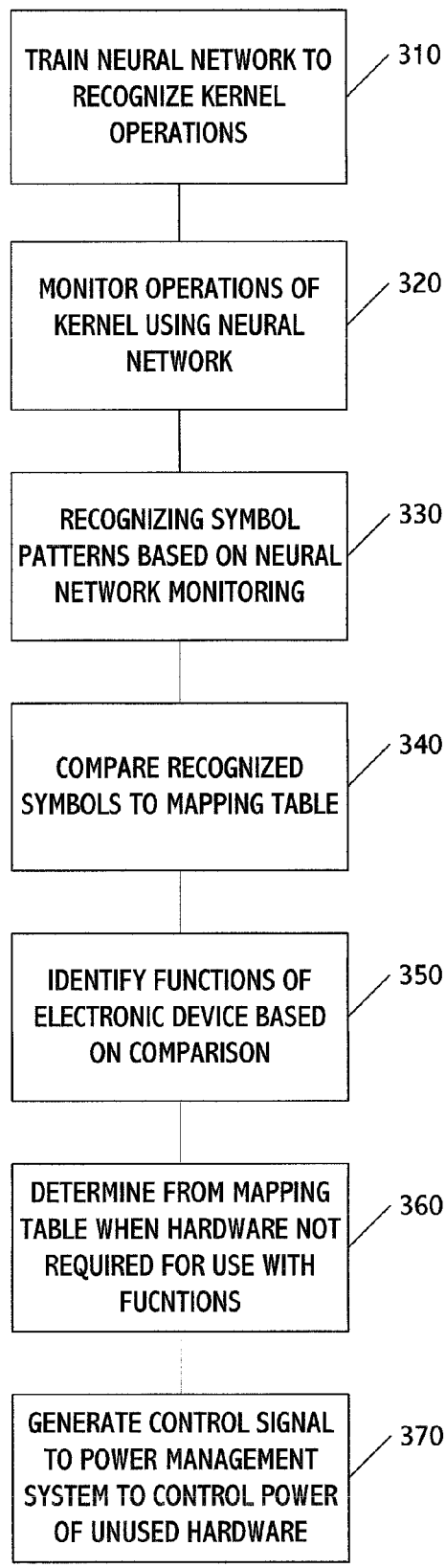
FIG. 3 is a diagram showing operations included one embodiment of a power management method which may be performed based on the preliminary operations in FIG. 2.

FIG. 3 shows one method in which the power management system may be controlled to manage power of the hardware sub-systems. In accordance with this method, the power management system may be controlled by a neural network 80 coupled, at least from a functional perspective, between the operating system Kernel and the power management system shown in FIG. 1.

In an initial Block 310, the neural network is trained to recognize operations performed by the Kernel. The training may be performed based on the information obtained by the preliminary operations in the method of FIG. 2. This information may be stored in the form of a lookup or mapping table as previously discussed, in a state diagram, or in any other form accessible by the neural network.

According to this embodiment, the neural network is trained to recognize operations performed by the Kernel based on Kernel symbols collected for each mapped function. The Kernel symbols are collected based on the instructions the Kernel must execute in order to perform the mapped function. The Kernel symbols correspond to a recognizable pattern of executed code that allows the neural network to identify the function being performed.

More specifically, each function to be performed by the Kernel requires execution of a particular set of instructions. For example, when a file needs to be copied from a USB memory to an internal memory of the electronic device, a certain set of instructions must be executed by the Kernel. The executed instructions and/or the results (e.g., hit symbols) that are generated by these instructions define a pattern which can be recognized by the neural network to identify the corresponding function.

After the neural network is trained, the neural network is used to monitor operations of the Kernel at runtime. (Block 320). During monitoring, symbol patterns derived from the Kernel are recognized as previously mentioned. (Block 330). In accordance with one embodiment, the symbols patterns are recognized in real-time based on the use of probes. For a Linux Kernel, kernel probes (kprobes) may be used to define symbols that are to be used in monitoring Kernel operations performed to implement a function of the electronic device.

A kprobe is a debugging mechanism for the Linux Kernel which can also be used for monitoring functions performed within the device. More specifically, a kprobe refers to a set of handlers placed on a certain instruction address and is defined by a pre-handler and a post-handler. When a kprobe is installed at a particular instruction and that instruction is executed by the Kernel, the pre-handler is executed just before execution of the kprobe instruction. Similarly, the post-handler is executed just after execution of the kprobe instruction. Through this process, the neural network is able to recognize a pattern which corresponds to a specific operation of the Kernel, which, in turn, corresponding to a specific function to be performed by the electronic device.

More specifically, in performing its monitoring function, the neural network collects patterns of Kernel symbols generated for corresponding functions executed in the electronic device. These patterns may be collected, for example, at predetermined intervals and then compared to the mapping table stored in memory. (Block 340). In performing this comparison, hit symbols output from the Kernel are compared to symbols patterns in the table.

When there is a match of symbol patterns in the table, the neural network is able to identify the corresponding function being performed by the electronic device. (Block 350).

Once the function has been identified, the neural network is able to determine from the table what hardware sub-systems are not required to be used to perform that function. (Block 360). The neural network may then send a control signal to the power management system to reduce or turn off power to one or more unused hardware sub-systems, at least for the duration of the function, all without involving use of the main processor and/or during a time when the main processor is an idle, standby, sleep, or other low-power state. (Block 370).

As an example, consider the case when an audio playback function is to be performed for a song file stored on the SD card. In accordance with the present method, the neural network may recognize performance of this function based on the instruction (hit symbol) pattern executed by the Kernel. Then, the neural network may generate a command which causes the power management system to reduce or shut off power to the WiFi and Gfx (graphics) sub-systems, because these sub-systems are not required to be used for that function.

The present method may also include a number of additional operations. For example, training of the neural network may take into consideration the simultaneous performance of multiple functions. For example, consider the case where a user operates the device to show a photo from the SD card at the same time video is being streamed from the Internet for display. In this case, the neural network will recognized from associated Kernel patterns the functions that are simultaneously being performed and not shut off power to the audio, SDIO, WiFi, or Gfx sub-systems. However, the neural network may send a command to the power management system to reduce or turn off power to hardware sub-systems that are not being used to support these functions.

Also, the neural network may be trained by generating and/or storing weights for each of the functions (or use cases) and then applying these weights for purposes of controlling power to the hardware sub-systems.

Figure 4:
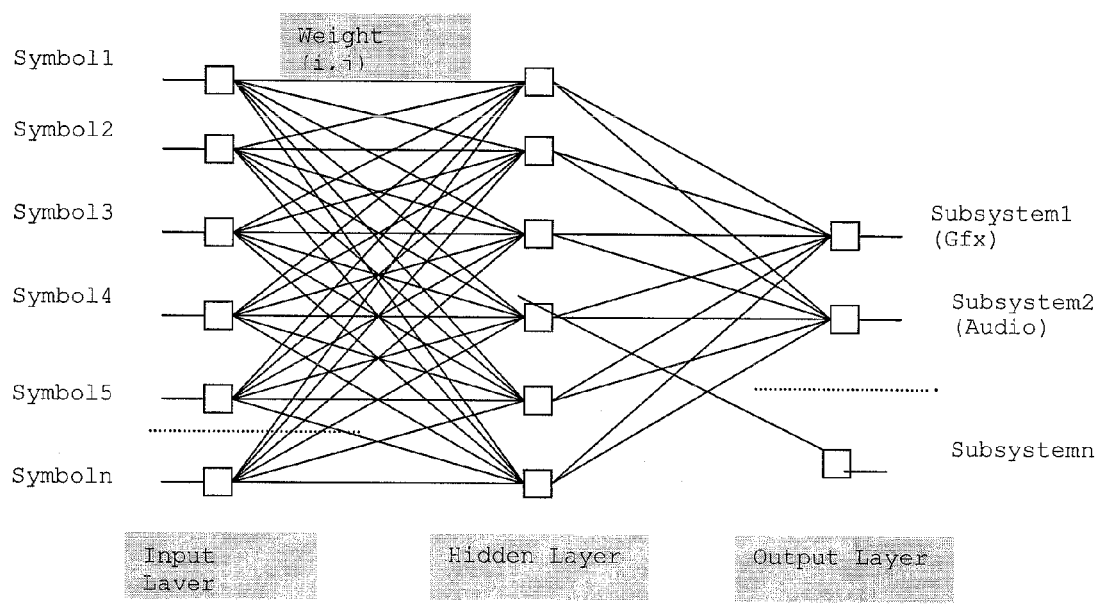
FIG. 4 is a diagram showing an example of one type of neural network that may be used to manage power in accordance with one or more embodiments described herein.

FIG. 4 shows an example of a neural network that may be used to implement one or more embodiments described herein. As shown, this neural network is a multi-layer perceptron that may be trained, for example, using a back propagation algorithm using sigmoid as the transition function.

While kprobes have been described for use in allowing the neural network to recognize hit symbols from a Linux Kernel, other types of probes or notification mechanisms may be used to inform the neural network of the hit symbols, especially when a Windows or other Kernel is used.

Figure 5:
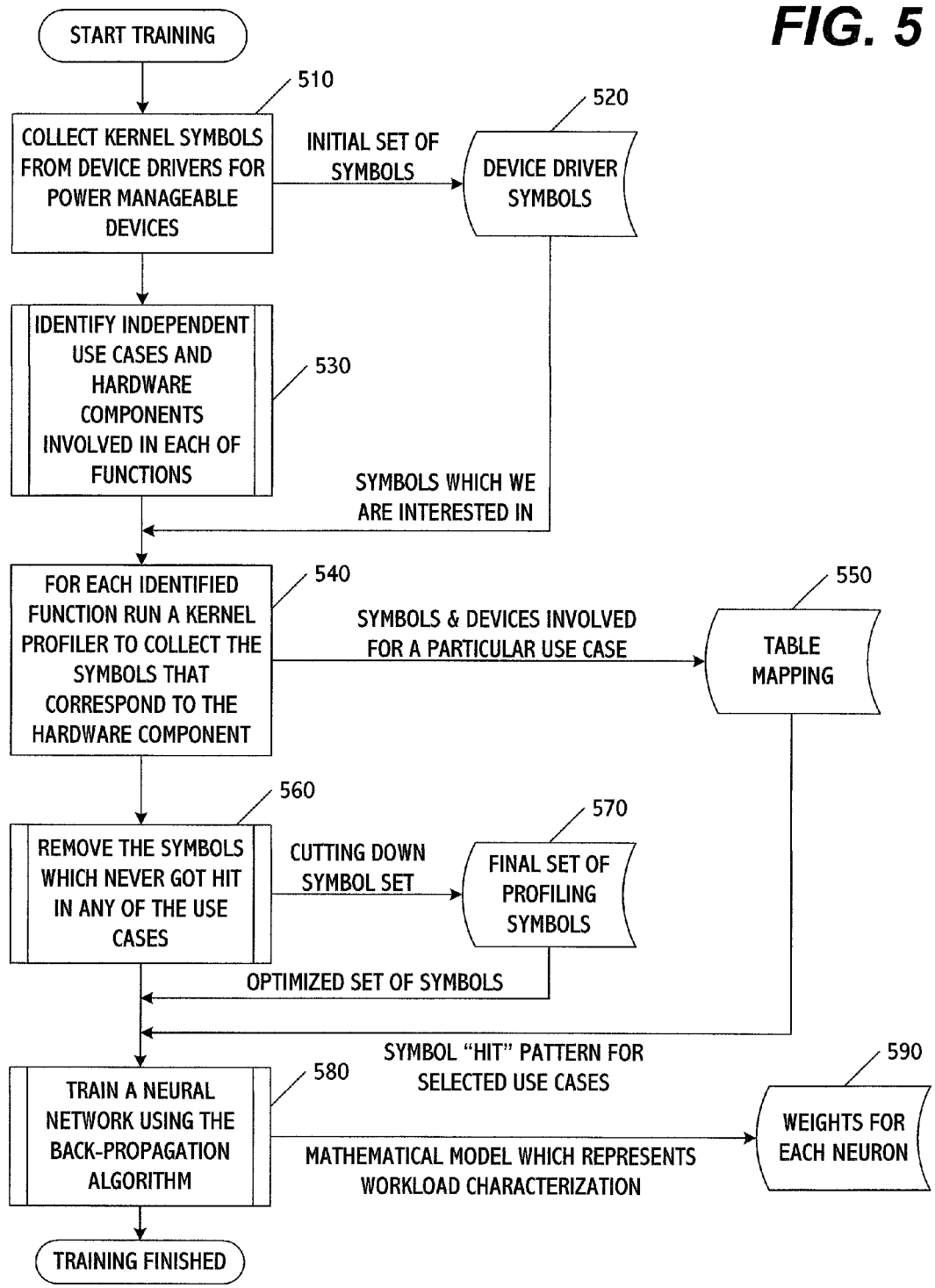
FIG. 5 is a diagram showing operations included in an embodiment of a method for training a neural network for managing power of an electronic device.

FIG. 5 shows operations included in another embodiment of a method for training a neural network for managing power of an electronic device. A first operation of this method includes collecting kernel symbols from device drivers for power manageable devices. (Block 510). Each device driver may correspond to a respective one of a plurality of hardware core or sub-system components. Once collected, the symbols are stored in an internal memory for later use. (Block 520).

A next operation includes identifying independent functions (e.g., use cases) and the hardware components that are required to perform each of the functions. (Block, 530). For each identified function, a kernel profiler is run to collect symbols (e.g., hit symbols) that correspond to the hardware components that are required to perform each of the functions. (Block 540). This operation is performed based on the symbols that were stored in memory in Block 520. A mapping table is then generated based on the symbols and functions. (Block 550).

A next operation includes identifying symbols of hardware components that are not used (i.e., symbols which are not hit) for each of the functions listed in the mapping table. The identified unused symbols are then removed (Block 560) from the mapping table to generate a final set of symbols and their associated functions (Block 570). Stated differently, the mapping table is edited so that each function is only associated with its hit symbols. As a result, what may be considered to be an optimized set of symbols is produced.

The neural network is then trained to recognize operations of the kernel based on comparing symbol patterns from kernel to the hit symbols in the mapping table. (Block 580). The neural network may be trained using any of a number of known techniques including but not limited to the aforementioned back-propagation algorithm. The output of the training process (which may include a weight for each neuron in the network) occurs in Block 590. (An example of how the weights may be generated and assigned is described in greater detail below). Power management may then be performed as previously indicated using these weights.

Figure 6:
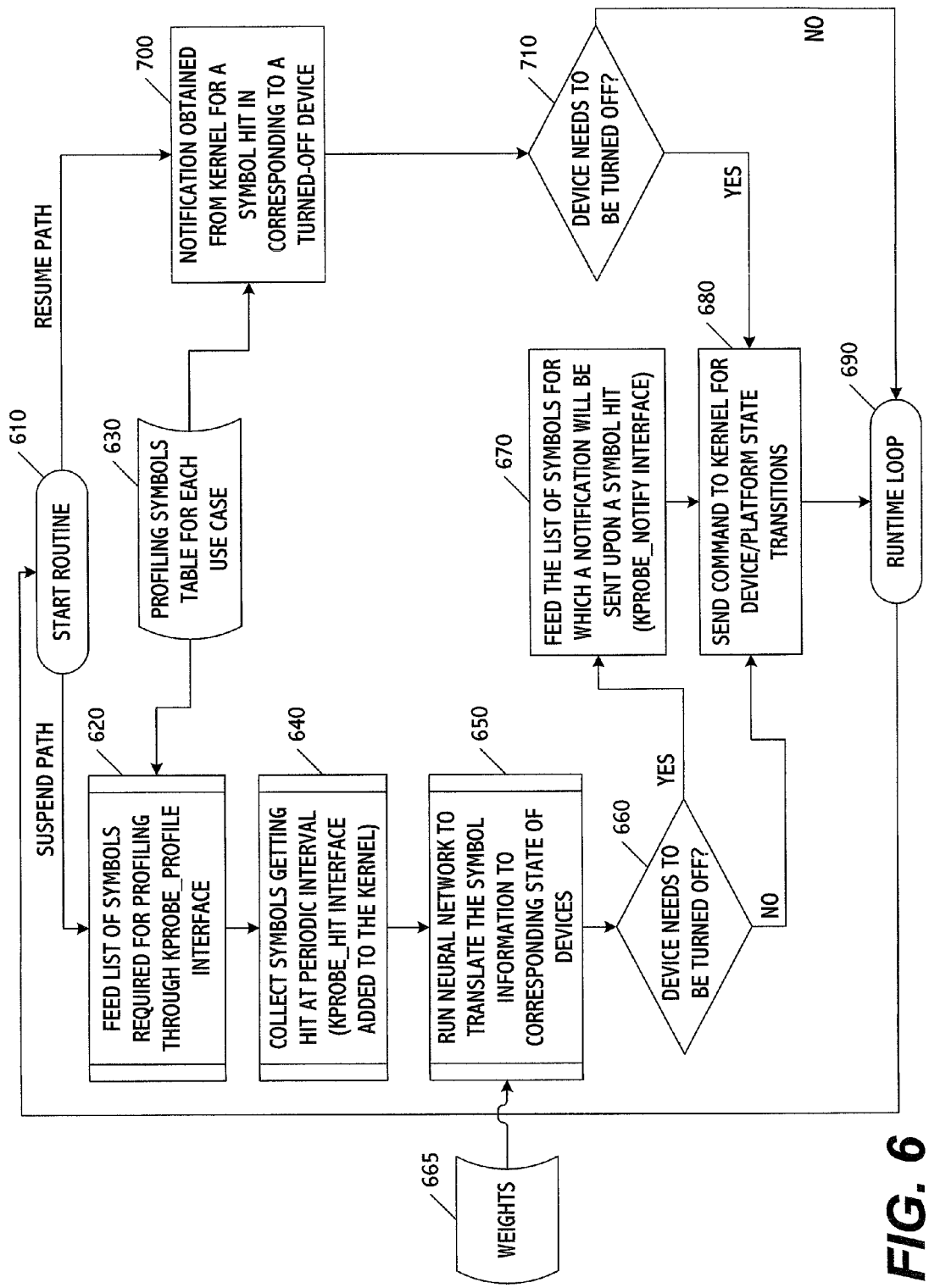
FIG. 6 is a diagram showing operations included in another embodiment of a method for managing power during runtime of an electronic device.

FIG. 6 is a diagram showing operations included in another embodiment of a method for managing power during runtime of an electronic device. This method may be performed, for example, based on the mapping table generated in FIG. 5 as well as other embodiments described herein.

An initial operation includes starting runtime of the electronic device. (Block 610). Process flow may then proceed along one of two paths. The first path is a suspend path used to effect power management control. During the suspend path, a list of symbols required for profiling is fed through a kprobe_profile interface for a Linux kernel. (Block 620). This operation is performed using the mapping (profiling symbol) table generated for each function (use case) in the electronic device. (Block 630).

Hit symbols are then collected at periodic intervals as the kernel performs various operations to support the functions of the device. (Block 640). This operation may be performed, for example, using a kprobe_hit interface added to the kernel.

After the hit symbols are collected, the neural network is run to translate symbol patterns to corresponding functions (or operating states) of the electronic device. (Block 650). This operation may be performed based on the weights previously mentioned, as derived from Block 660. These weights may be stored in an internal memory and set according to manufacturer and/or user preferences.

Once the function(s) or operating states of the device are determined, a determination is made as to whether power to one or more hardware components is to be reduced or shut off. (Block 660). This determination may be made by the neural network based on, for example, hardware components which do not have corresponding hit symbols.

If the determination in Block 660 is yes, then the neural network outputs control signals to the power management system to reduce or turn off power to one or more hardware components that are not required to operate for these functions or states, e.g., for hardware components that do not have hit symbols at this time. (Block 670). This may involve feeding a list of symbols for which a notification can be sent upon a symbol hit, via the kprobe_notify interface. The control signal may be in the form of a command to the kernel for a device/platform state power transition, i.e., a transition to a lower power state or a shut-off power state. (Block 680).

If the determination in Block 660 is no, then process flow may proceed to Block 680 for controlling (e.g., turning on) power to the hardware components that correspond to hit symbols. Process flow may then proceed to the runtime loop Block 690 and then back to start runtime.

The resume path includes a different set of operations performed, for example, when power to a hardware component has been turned off or placed in a low-power state. When power to this hardware component is to be resumed, notification is obtained from the kernel indicating that a hit symbol exists relating to the hardware component. This notification provides an indication to the neural network that power to the hardware component is to be turned on, for example, to a predetermined level, because the kernel is currently executing instructions that correspond to a device function that must be performed using the hardware component. (Block 700). The neural network then generates a signal for causing the power management system to power that component. (Block 710). Otherwise, control returns to the runtime loop.

Neural Network

As previously indicated, a neural network in the form of a multi-layer perceptron may be used to implement one or more embodiments described herein. A perceptron is a type of neural network that can be thought of as a classifier, in that it can differentiate between sets of data and, more importantly, can classify a previously unseen data example into one of a plurality of the learned sets. The structure of a single perceptron may include a number of inputs ($x_n$), weights ($w_n$), a bias (b), and an output.

Figure 7:
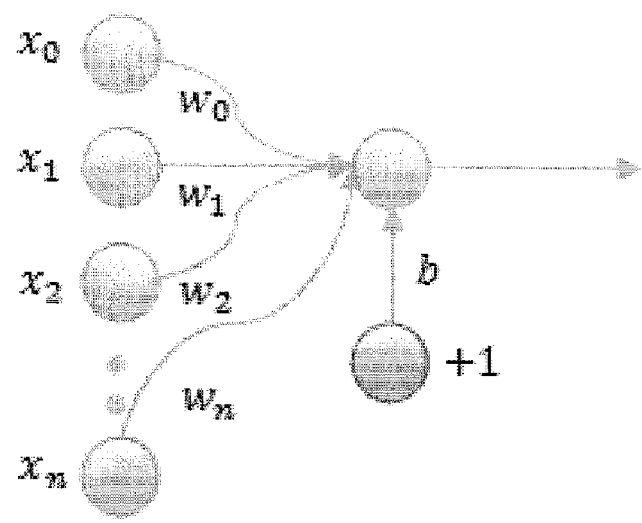
FIG. 7 is a diagram showing an example of a perceptron which may form the basis of a neural network that may be used to implement one or more embodiments.

FIG. 7 shows an example of a perceptron. As shown, for every input (including a bias) on the perceptron, there is a corresponding weight, e.g., $w_0, w_1, \ldots w_n$. To calculate the output of the perceptron, every input is multiplied by its corresponding weight. A weighted sum is then fed through a limiter function that determines the final output of the perceptron. The limiter function for a simple perceptron might be a stepped limiter, for example.

That is, the perceptron is calculated by summing all the inputs multiplied by their weights plus the bias, and then the weighted sum is run through a limiter. In mathematical terms, these can be defined as:

$$\text{Net} = \sum_{i=0}^{n} x_i w_i + b$$

$$f(x) = \left\{ \begin{array}{l} x \leq 0 \rightarrow 0 \\ x \geq 0 \rightarrow 1 \end{array} \right\}$$

The output of the limiter corresponds to the output of the perceptron. For example, if the weighted sum is −2, the perceptron may return 0. Or, if the sum is 3, the perceptron may return 1. If a perceptron returns 1, the perceptron may be considered to have "fired."

A perceptron of this type may be taught to classify data sets that are presented to it. The perceptron may be trained to classify data sets by modifying one or more of the weights. The so-called Delta Rule may be used for this purpose. According to this rule, the weights are to be adjusted based on a difference between an intended output and the actual output, or as expressed in mathematical terms:

$$\Delta w_i = x_i \delta$$

where $\delta$=(desired output)−(actual output)

The Perceptron Convergence Theorem may be used during this training. According to this theorem, if a solution can be implemented on a perceptron, the learning rule will find the solution in a finite number of operations.

Perceptrons can only classify data when the two classes can be divided by a straight line (or, more generally, a hyperplane if there are more than two inputs). This is called linear separation. To explain the concept of linear separation further, consider the following function.

| $y = x_1$ AND NOT($x_2$) | | |
|---|---|---|
| $x_1$ | $x_2$ | y |
| 0 | 0 | 0 |
| 0 | 1 | 0 |
| 1 | 0 | 1 |
| 1 | 1 | 0 |

If this data is run through a perceptron, the weights could converge at 0 for the bias and 2, −2 for the inputs. If the weighted sum (or net value) are calculated, the following result may be obtained:

$$\text{net} = \sum_{i=0}^{2} w_i x_i + b$$

$$\text{net} = 2x_0 - 2x_1 + 0b$$

$$\text{net} = 2x_0 - 2x_1$$

Figure 8:
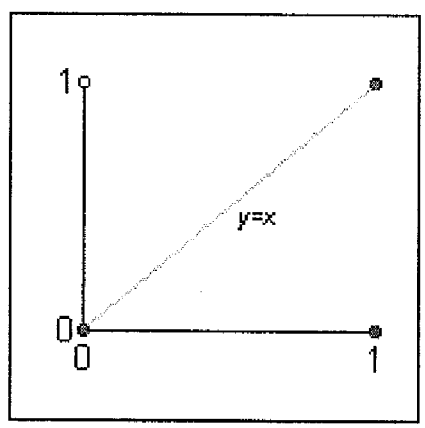
FIG. 8 is a graph showing values plotted in association with a neural network which may be trained and implemented in accordance with one or more embodiments.

If $x_0$ is plotted on the y-axis, and x on the x-axis, the equation can be reduced to $x_0 = x_1$ as shown in FIG. 8. In this plot, it is seen that the perceptron correctly draws a line that divides two groups of points. If an attempt is made to train the perceptron on data that is not linearly-separable, the weights of the perceptron will not converge on a solution. If non-linearly separable data are to be considered, another solution is therefore needed.

An example of one type of perceptron that can return a solution of non-linearly separable data is a multilayer perceptron. An example of non-linearly separable data is the exclusive-OR (XOR) logic operator. XOR is the same as OR but is false when both inputs are true (thus exclusive). If the aforementioned data is plotted, it is evident that the data cannot be separated using a simple line.

The XOR problem can be solved using three arranged perceptrons. According to this approach, the XOR problem is split into three different parts using boolean mathematics. According to this approach, '^' is AND, 'v' is OR, NOT is ¬

XOR can be defined as:

$$y=(x_1 \text{ AND NOT}(x_2)) \text{ OR } (\text{NOT}(x_1) \text{ AND } x_2)$$

—or—

$$y=(x_1 \text{ OR } x_2) \text{ AND NOT}(x_1 \text{ AND } x_2)$$

This may be split into three subcomponents as follows:

$$y_1 = x_1 \text{ OR } x_2$$

$y_2$=NOT($x_1$ AND $x_2$)

y=$y_1$ AND $y_2$

Figure 9:
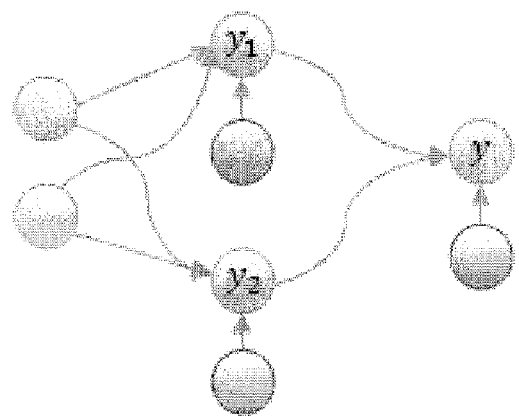
FIG. 9 is a diagram showing an example of a multilayered perceptron.

The problem is now broken down into three different linearly separable problems, where the results from the first two equations can be used in a third. From the final three equations, it can be seen that the perceptrons would be connected in the manner shown in FIG. 9.

To prove that it works, look at the weights (and thus the lines) at which the perceptron converges. The first perceptron balances at {1, 1, 0} (in this case, the last element is the bias), the second at {−1, −1, 2} and the final one at {1, 1, −1}. The three equations are as follows:

$net_1 = \Sigma w_i x_i + b = x_1 + x_2$ $\therefore x_1 = x_2$ $net_2 = \Sigma w_i x_i + b = -x_1 - x_2 + 2$ $\therefore x_1 = -x_2 + 2$ $net_3 = \Sigma w_i x_i + b = y_1 + y_2 - 1$ $\therefore y_1 = -y_2 + 1$ The final equation may be considered to be the equation that covers the third perceptron that takes the output of the first two as its inputs. This can be plotted on the graphs in FIG. 10, which shows the output for the XOR network.

Figure 10:
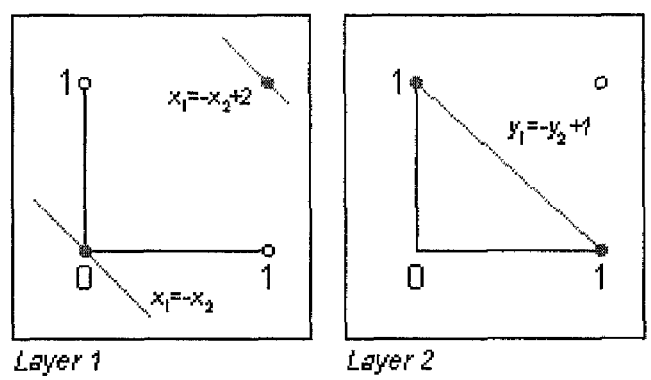
FIG. 10 are graphs showing outputs for an XOR network.

In FIG. 10, the layer 1 lines cut the graph into three parts. The center region between the two lines is where the perceptron will generalize as a '1', with the other areas on and above/beneath the two other lines as '0'. As show in Layer 2, the third perceptron creates the final result. Because the two lines in Layer 1 do not intersect at the origin, the third perceptron never has to be dealt with.

Setting the Weights

The foregoing example shows how the multilayer architecture may work and how perceptrons may be extended to learn a variety of other functions as long as the weights are known. Or, the problem may be split into smaller, linearly-separable components to which the delta learning rule may be applied. But, what how can the network be trained if the foregoing cannot be applied. There are many different ways to teach a neural network. As previously mentioned, one ways is known as the back-propagation algorithm.

In a single-layer network, each neuron adjusts its weights according to what output was expected of it, and the output it gave. This can be mathematically expressed by the Perceptron Delta Rule:

$\Delta w_i = x_i \delta$ where δ=(desired output)−(actual output)

In the above equations, w is the array of weights and x is the array of inputs. The Perceptron Learning Rule is of no use though when the network is extended to multiple layers to account for non-linearly separable problems. This is because, when adjusting a weight in the network, it must be determined what effect this adjustment will have on the overall effect of the network. To do this, the derivative of the error function must be looked to with respect to that weight.

Figure 11:
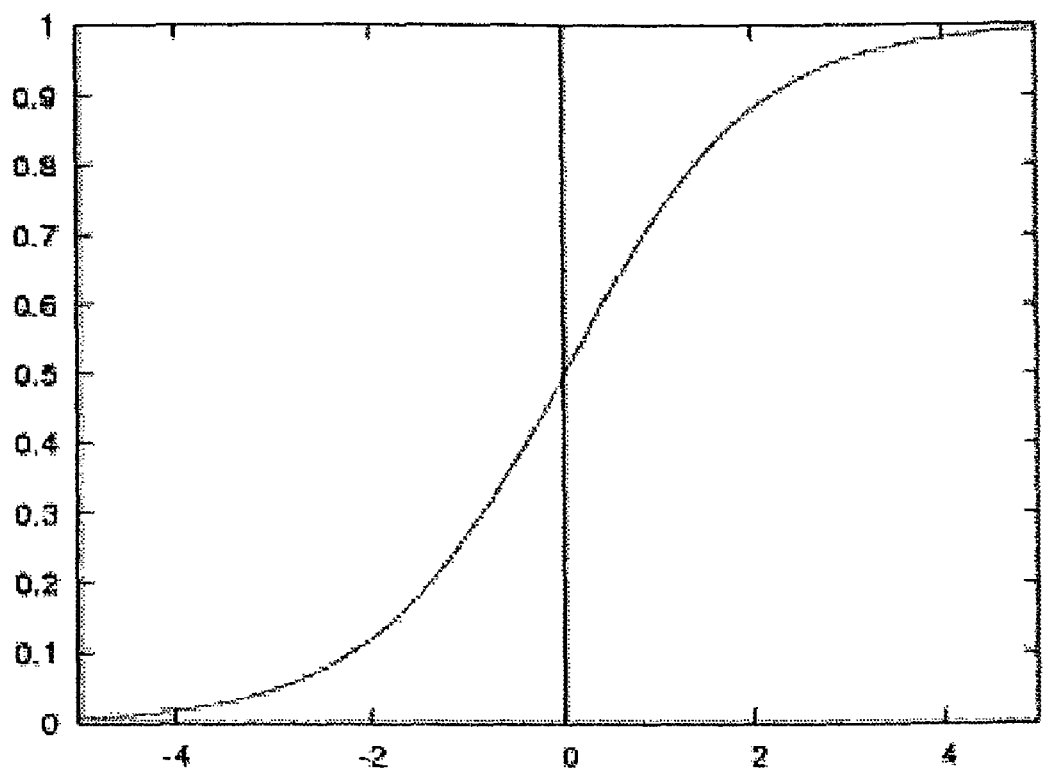
FIG. 11 is a graph showing values associated with a Sigmoid function.

In performing back-propagation, the Sigmoid (logistic) function may therefore be used. The equation to perform this function are shown as follows and FIG. 11 shows a graph corresponding to this function:

$$y = \frac{1}{1+e^{-x}}$$

$$y' = x(1-x)$$

As can be seen, the function plateaus at 0 and 1 on the y-axis and it also crosses the y-axis at 0.5, making the function 'neat'. Furthermore, it neatly differentiates to f(x)=x(1−x). With all of this in mind, let's revisit the perceptron learning rule with a little alteration:

$\Delta w_i = \eta x_i \delta$ where $\delta_i = f'(net_i)(d_i - y_i)$

In these equations, w, x are as indicated above and n is defined as the learning rate. The terms $y_i$ and $d_i$ are the actual and intended outputs, respectively. So, using the Sigmoid activation function, the equation for calculating the deltas for the output layer may be rewritten as:

$\delta_i = y_i(1-y_i)(d_i - y_i)$

In view of the foregoing, the net sum of each neuron in the network and the delta for the output layer may be calculated. The delta the hidden layers may be calculated as follows.

To calculate this delta, the effect must be known on the output of the neuron if a weight is to change. Therefore, the derivative of the error with respect to that weight must be determined. It has been proven that for neuron q in hidden layer p, delta is calculated as:

$\delta_p(q) = x_p(q)[1-x_p(q)]\Sigma w_{p+1}(q,i)\delta_{p+1}(i)$

A neural network as described above may therefore be applied in accordance with one or more embodiments described herein.

Another embodiment of the present invention corresponds to a computer-readable medium which stores a computer program that performs any of the method embodiments disclosed herein. The computer-readable medium may be a read-only memory, random access memory, flash memory, or any other storage device included within or that is accessible by a mobile terminal or other electronic device controlled by the kernel. The computer program may be included as firmware, middleware, or any other type of control software implementable in an electronic device.

Moreover, the program may be executed by an internal processor, integrated circuit, controller, or central processing unit of the electronic device, including but not limited to chip circuits of the type used to control operation of a notebook or desktop computer, personal digital assistant, smart phone, or mobile phone or terminal as well as other electronic devices that are controlled by a kernel.

By way of example, one such computer-readable medium stores a computer program having a first code section to recognize a symbol pattern generated from a kernel, a second code section to identify a function of an electronic device based on the symbol pattern, and a third code section to reduce or shut power off to a hardware component of the electronic device based on the identified function. In accordance with at least one embodiment, the hardware component is not required for use in performing the identified function.

The first code section may recognize the symbol pattern by generating a mapping table which maps symbol patterns to a respective plurality of functions of the electronic device and comparing the symbol pattern generated from the kernel to the symbol patterns in the mapping table, wherein the function of the electronic device is identified based on a match generated from the comparison. The symbol pattern may be generated based on probes included in a set of instructions executed by the kernel. In accordance with one application, the first code section is implemented by a neural network trained based on the mapping table.

The third code section may cause the device to reduce or shut off power to the hardware component without use of a main processor of the electronic device. Furthermore, the third code section may reduce or shut off power to the hardware component at a time when a main processor of the electronic device is in a low-power state.

Additionally, the computer program may include a fourth code section to generate a control signal for reducing or shutting off power to the hardware component based on the match generated by the comparison, the control signal to control operation of a power management system provided separately from a main processor of the electronic device.

Any reference in this specification to an "embodiment" means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Furthermore, for ease of understanding, certain functional blocks may have been delineated as separate blocks; however, these separately delineated blocks should not necessarily be construed as being in the order in which they are discussed or otherwise presented herein. For example, some blocks may be able to be performed in an alternative ordering, simultaneously, etc.

Although embodiments of the present invention has been described herein with reference to a number of illustrative embodiments, it should be understood that numerous other modifications and embodiments can be devised by those skilled in the art that will fall within the spirit and scope of the principles of this embodiments of the invention.

More particularly, reasonable variations and modifications are possible in the component parts and/or arrangements of the subject combination arrangement within the scope of the foregoing disclosure, the drawings and the appended claims without departing from the spirit of the embodiments of the invention. In addition to variations and modifications in the component parts and/or arrangements, alternative uses will also be apparent to those skilled in the art.

We claim:

1. An electronic device comprising:
a kernel;
a power manager to control power to a hardware component; and
a neural network to monitor the kernel to recognize performance of a function of the electronic device, the neural network to send a signal to the power manager to reduce or turn off power to the hardware component based on information generated during monitoring of the kernel, wherein the neural network is to recognize performance of the function of the electronic device based on symbols generated from the kernel, and wherein the symbols are to be generated from the kernel based on probes set within the instructions to be executed by the kernel during performance of the function.

2. The electronic device of claim 1, wherein the hardware component is not required to perform the function of the electronic device.

3. The electronic device of claim 1, wherein the power manager is to reduce or turn off power to the hardware component without using a main processor of the electronic device.

4. The electronic device of claim 1, wherein the power manager is to reduce or turn off power to the hardware component during a time when a main processor is in a low-power state.

5. The electronic device of claim 1, wherein the neural network is to recognize performance of the function of the electronic device by comparing the symbols to a mapping table, the mapping table to identify patterns of symbols of hardware components of the electronic device for each of a plurality of predetermined functions.

6. The electronic device of claim 1, wherein the kernel is an open source kernel.

7. The electronic device of claim 1, wherein the electronic device is a battery-powered communication device.

8. A power management method comprising:
recognizing a symbol pattern generated from a kernel;
identifying a function of an electronic device based on the symbol pattern; and
reducing or shutting power off to a hardware component of the electronic device based on the identified function, wherein the hardware component is not required for use in performing the identified function and wherein the symbol pattern is generated based on probes included in a set of instructions executed by the kernel.

9. The method of claim 8, wherein power to the hardware component is reduced or shut off without use of a main processor of the electronic device.

10. The method of claim 8, wherein power to the hardware component is reduced or shut off at a time when a main processor of the electronic device is in a low-power state.

11. The method of claim 8, wherein said recognizing includes:
generating a mapping table which maps symbol patterns to a respective plurality of functions of the electronic device; and
comparing the symbol pattern generated from the kernel to the symbol patterns in the mapping table, wherein the function of the electronic device is identified based on a match generated from the comparison.

12. The method of claim 8, wherein said recognizing is performed by a neural network.

13. The method of claim 12, wherein the neural network generates a control signal for reducing or shutting off power to the hardware component based on the match generated by the comparison, the control signal controlling operation of a power management system provided separately from a main processor of the electronic device.

14. The method of claim 8, wherein the kernel is an open source kernel.

15. A computer-readable medium to store a computer program comprising:
a first code section to recognize a symbol pattern generated from a kernel;
a second code section to identify a function of an electronic device based on the symbol pattern; and
a third code section to reduce or shut power off to a hardware component of the electronic device based on the identified function, wherein the hardware component is not required for use in performing the identified function and wherein the symbol pattern is generated based on probes included in a set of instructions executed by the kernel.

16. The computer-readable medium of claim 15, wherein the third code section is to reduce or shut off power to the hardware component without use of a main processor of the electronic device.

17. The computer-readable medium of claim 15, wherein the third code section is to reduce or shut off power to the hardware component at a time when a main processor of the electronic device is in a low-power state.

18. The computer-readable medium of claim 15, wherein the first code section is to be implemented by a neural.

19. The computer-readable medium of claim 18, further comprising:
   a fourth code section to generate a control signal for reducing or shutting off power to the hardware component based on the match generated by the comparison, the control signal to control operation of a power management system provided separately from a main processor of the electronic device.

20. An electronic device comprising:
   a kernel;
   a power manager to control power to a hardware component; and
   a controller to monitor the kernel to recognize performance of a function of the electronic device, the controller to send a signal to the power manager to reduce or turn off power to the hardware component based on information generated during monitoring of the kernel, wherein the controller is to recognize performance of the function of the electronic device based on symbols generated from the kernel and wherein the symbols are to be generated from the kernel based on probes set within the instructions to be executed by the kernel during performance of the function.

21. The electronic device of claim 20, wherein the controller includes a neural network.

22. The electronic device of claim 20, wherein the hardware component is not required to perform the function of the electronic device.

* * * * *